No. 888,747. PATENTED MAY 26, 1908.
J. F. RUDE & J. W. SMITH.
MANURE SPREADER.
APPLICATION FILED JUNE 24, 1907.
2 SHEETS—SHEET 2.
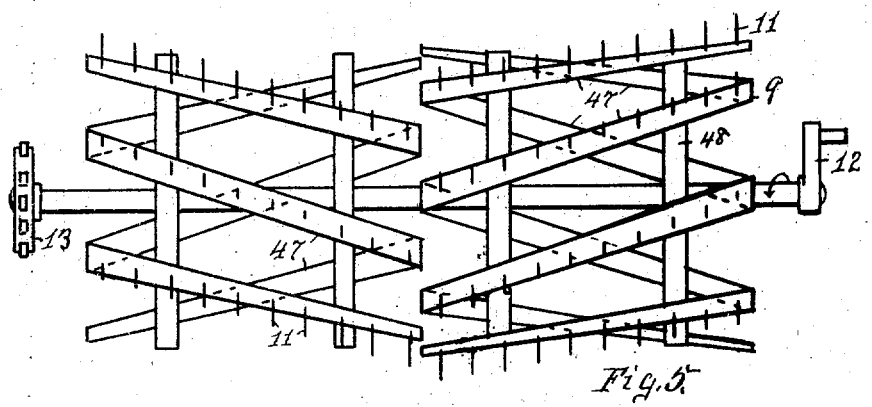
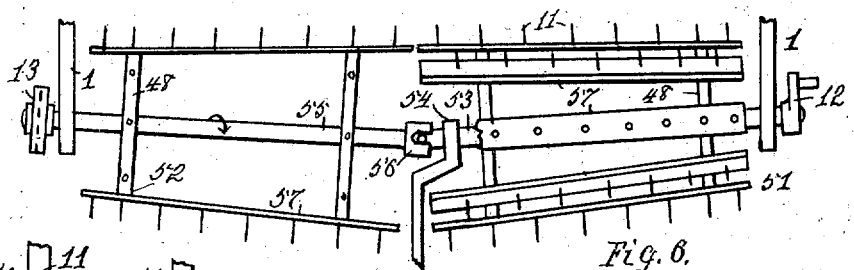
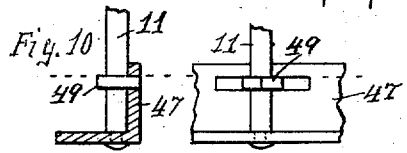
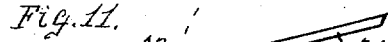
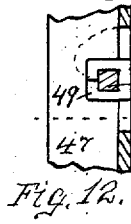
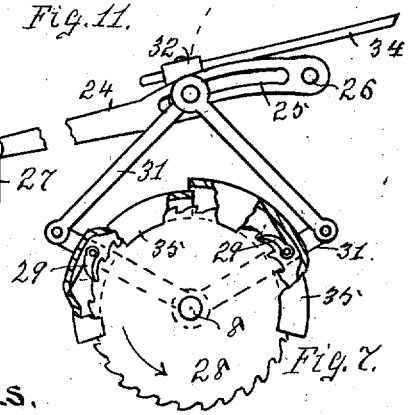
WITNESSES,
A. P. Stork.
Samuel S. Carr.
INVENTORS,
John F. Rude and
John W. Smith.
By Robert S. Carr, Atty.

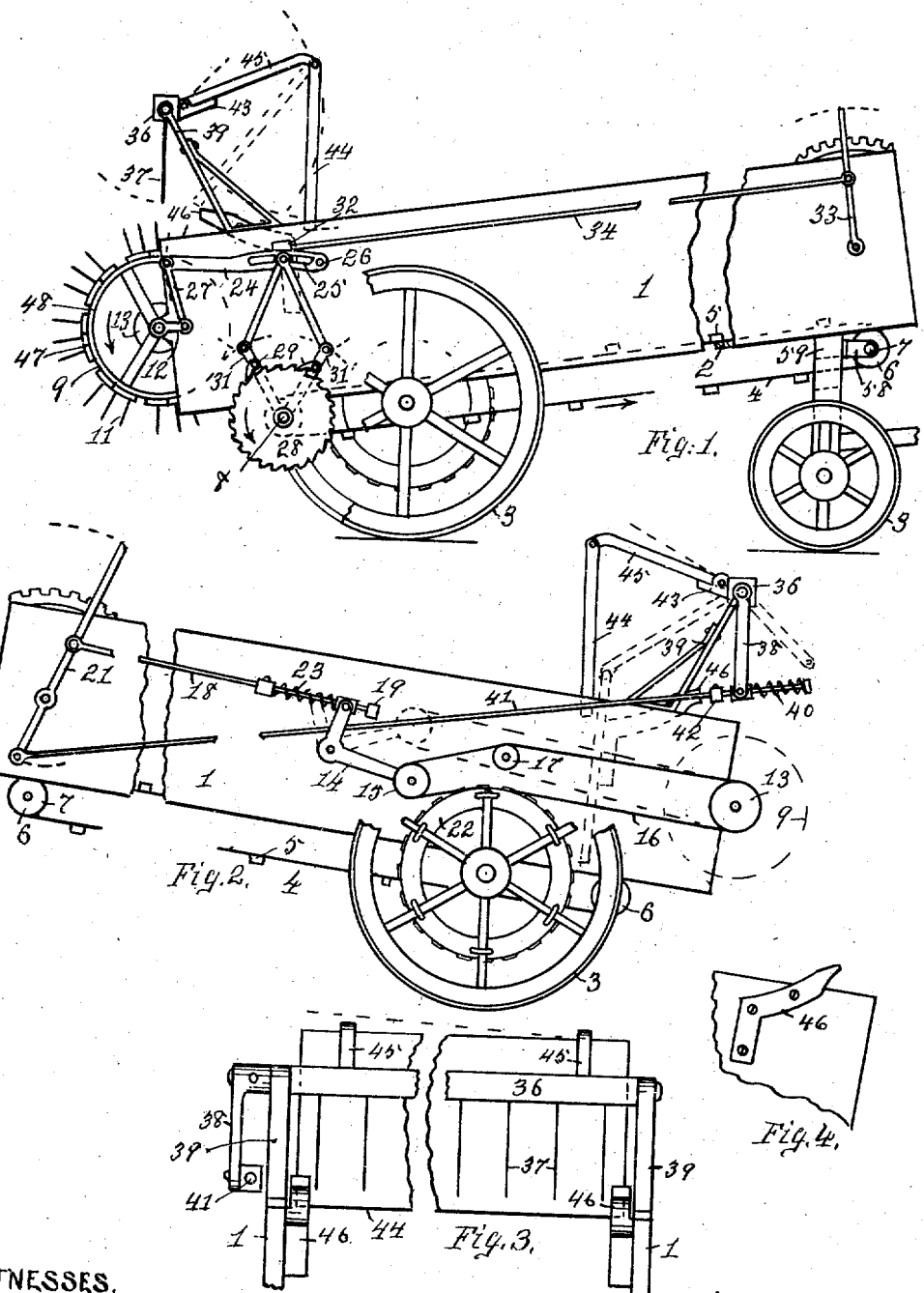

UNITED STATES PATENT OFFICE.

JOHN F. RUDE AND JOHN W. SMITH, OF LIBERTY, INDIANA, ASSIGNORS TO THE RUDE BROTHERS MANUFACTURING COMPANY, OF LIBERTY, INDIANA, A CORPORATION OF INDIANA.

MANURE-SPREADER.

No. 888,747.

Specification of Letters Patent.

Patented May 26, 1908.

Application filed June 24, 1907. Serial No. 380,389.

*To all whom it may concern:*

Be it known that we, JOHN F. RUDE and JOHN W. SMITH, citizens of the United States, residing at Liberty, Indiana, have invented a new and useful Improvement in Manure-Spreaders, of which the following is a specification.

Our invention relates to manure spreaders of the class provided with a distributing cylinder and with means for moving the load into contact therewith, and the objects of our improvements are to utilize the tail gate for a swinging hood over the beater; to provide means for moving and maintaining the rake under a yielding pressure in different angles to the beater; to provide adjustable ratchet mechanism for moving the carrier at different speeds; to arrange the beater teeth in helical lines for distributing the contents of the box more evenly; to provide means for facilitating the removal of the carrier and for adjusting its tension; to provide novel means for securing the teeth to the angle iron beater bars, and to provide simple and durable construction and assemblage of parts combined with facility of operation and efficiency of action. These objects are attained in the following described manner, as illustrated in the accompanying drawings, in which:—

Figures 1 and 2 are elevations respectively of the right and left sides with parts removed of a manure spreader embodying our improvements; Fig. 3, a rear elevation of the rake and the tail gate; Fig. 4, a side elevation of a tail gate stop; Figs. 5 and 6 plans showing different forms respectively of the beater; Fig. 7 a side elevation with parts broken away of the adjustable ratchet mechanism with its connections for actuating the endless carrier at different speeds; Figs. 8 and 9, a front elevation and a plan respectively of the bearings for the front shaft of the endless carrier. Figs. 10, 11 and 12 are details showing the manner of securing the teeth to a beater bar.

In the drawings, 1 represents the sides of a wagon body provided with a bottom 2 and carried by ground wheels 3. An endless carrier 4 provided with transverse bars 5 and movable rearwardly on the upper surface of the bottom is carried by sprocket wheels 6 on front and rear transverse shafts 7 and 8. A beater or distributing cylinder 9 provided with radially projecting teeth 11 and with a crank 12 and a sprocket wheel 13 on its respective ends is journaled across the rear end of the body. A bell crank lever 14 pivotally attached to the side of the body is provided with an idler 15, and a chain 16 engaging with said idler and with wheel 13 has its middle portion supported by an idler 17 which is secured to the body.

A rod 18 provided with a stop 19 movably engages with the bell crank lever and is actuated by means of detent lever 21 with the stop in contact with said lever for moving idler 15 with chain 16 out of engagement with the driving sprocket wheel 22 which is carried by one of the ground wheels, as shown by dotted lines in Fig. 2. A spring 23 on rod 18 serves to move and yieldingly maintain the bell crank lever with the said chain in engagement with the driving sprocket wheel for actuating the beater.

An arm 24 provided with a slot 25 is pivotally secured at one end to the side of the body at 26 and connected at the other end with crank 12 by means of a connecting rod 27, whereby it may be oscillated in a vertical plane. A ratchet wheel 28 is secured on shaft 8 and pawls 29 adapted to coact therewith are carried by jointed or knee levers 31 which are pivotally connected at one end with a block 32 slidably mounted within slot 25 in arm 24. A detent lever 33 attached to the side of the body and connected with said block by means of rod 34 serves to move and maintain the block in different positions along the slot for changing the throw of the knee levers with the pawls, whereby the speed of the ratchet wheel with the endless carrier actuated thereby may be changed or entirely discontinued. The segments 35 of a hood for protecting the ratchet wheel are carried by the respective knee levers and are movable the one over the other at their adjacent ends as shown in Fig. 7.

A rake head 36 provided with teeth 37 and with a crank arm 38 on one end is journaled directly over the beater in bracket bearings 39 attached to the body. A rod 41 provided with an adjustable stop 42 and connected with the extended end of detent lever 21 movably engages with the crank arm and by contact of the stop therewith serves to move and maintain the rake head with the teeth 37 in a rearward and upward direction from the beater as shown by dotted lines in Fig. 2. A spring 40 on said rod serves to move and maintain the rake head in the opposite direction with the rake teeth in operative position over the beater as shown in Fig. 1. Stops 43 are removably secured to the rake head by bolts (not shown) and a tail gate 44 swingingly depends from arms 45 which are pivotally secured to, and supported by said stops. Angular cleats 46 attached to the sides of the body serve to prevent the tail gate from descending into contact with the beater as shown by dotted lines in Fig. 1, and also to maintain it in proper position to close the rear end of the body as shown by dotted lines in Fig. 2. The tail gate is supported over the beater to serve as a hood during the discharge of the manure thereby as shown by dotted lines in Fig. 1.

The beater bars 47 are preferably secured to the spiders 48 with their adjacent ends out of registration with each other and with the radially projecting teeth 11 in parallel helical lines of steep pitch extending respectively from the center toward the ends of the beater in a rearward direction as shown in Fig. 5. Said bars preferably consisting of angle iron are provided with tongues 49 partially cut from one side thereof and adapted to clenchingly secure the body of the teeth thereto which are also secured at one end to the other leg or side of the angle, as shown in Figs. 10, 11 and 12.

The modified form of beater shown in Fig. 6 consists of two members 51 and 52 each in form the frustum of a cone and with their bases adjacent to each other, the front edges of the beaters being one tangential plane. The shaft 53 of one member is journaled near its base end in a bracket bearing 54 which may be secured to a cross rail or other fixed point (not shown). The shaft 55 of the other member is connected to and drives shaft 53 by means of a universal joint 56 of the usual construction. The beater bars 57 attached to each member may be parallel to its axis or with the teeth in helical lines as desired. Housings 58 are removably bolted on the transverse body bolster 59 and the bearings 61 for the ends of the idle shaft 7 of the endless carrier are slidably mounted therein and adjustable by means of adjusting screws 62 with the shaft 7 more or less distant from the bolster for regulating the tension of said carrier.

In operation, the detent lever 21 together with its mechanical connections serves to move and yieldingly maintain the driving chain 16 for the beater into engagement with the driving sprocket wheel 22, and to simultaneously elevate the tail gate as shown in Fig. 2. In this position the tail gate is freely movable by the load on the beater into the position shown by dotted lines in Fig. 1 to ride as a hood thereover. The spring 40 may yield to permit an obstruction to pass the rake teeth and the cleats 46 on the body prevent the descent of the tail gate into contact with the teeth of the beater.

Arm 24 is continuously oscillated during the action of the beater without actuating the ratchet wheel with the endless carrier when block 32 is in its most forward position and until the sliding block 32 is moved in slot 25 in a direction from the pivot 26 by means of the detent lever 33 and its mechanical connections therewith. The arrangements of the teeth of the beater in helical lines causes them to lift the material and pass the teeth of the rake gradually which distributes the manure more continuously and evenly than would be possible with the teeth in rows parallel to the rake teeth. This arrangement of the beater teeth also economizes the driving power.

The distribution of the teeth in helical retreating lines from the middle toward the ends of the beater tends to move the middle of the load where it is usually the deepest toward the ends of the beater for spreading it more evenly in a lateral direction. For the same purpose the beater shown in Fig. 6 serves to distribute the load over a wider path in both directions from its center and also to develop gradually increasing peripheral speed from the ends toward the middle of the beater. When it is desired, the rake head may be turned with the teeth in an upward or outward position entirely out of action and the crank arm and tail gate arms may be attached to it in a different circumferential position but in the same relation to each other for the purpose of operating the tail gate without bringing the teeth into operative position above the beater.

The rake teeth may be omitted altogether and the tail gate acting as a hood be substituted therefor if desired. The adjustable bearings for shaft 7 permits of its adjustment for changing the tension of the carrier and the removable housings serves to facilitate the removal or replacement of the shaft 7 for the attachment or removal of the endless carrier. The angle iron beater bars if desired may be twisted properly to cause the teeth therein to conform to radial lines and the bars to conform to the helical lines of the beater.

What we claim as our invention and desire to secure by Letters Patent of the United States is:—

1. In a manure spreader, the combination of a beater, a shaft journaled thereover, arms hinged on the shaft, and movable independently in relation thereto, a tail gate pivotally attached to the arms, and means for rocking the shaft with the arms simultaneously for lifting the tail gate.

2. In a manure spreader, the combination of a beater, a shaft journaled thereover, arms independently movable on the shaft, a swinging tail gate depending from the arms, and means for rocking the shaft with the arms simultaneously for moving and maintaining the tail gate over the beater.

3. In a manure spreader, the combination of a beater, a rake journaled parallel with the beater, independently movable arms hinged on the rake, a tail gate swingingly depending from the arms, and lever mechanism for rocking and yieldingly maintaining the rake with its teeth toward the beater and with the tail gate in an elevated position.

4. In a manure spreader, a beater consisting of similar members each being in form of the frustum of a cone with their bases adjacent to each other, their front edges in one tangential plane and a universal joint connecting their axes together.

5. In a manure spreader, the combination of a beater, a rake thereover, arms hinged to the rake head, a tail gate pivotally depending from the arms, means for rocking the rake for lifting the tail gate, and stops for intercepting the descent of the tail gate toward the beater.

6. In a manure spreader, the combination of a carrier, a driving shaft therefor and provided with a ratchet wheel, an arm pivotally secured at a fixed point, knee levers movable at one end on the shaft, means movably connecting the other ends thereof with the arm, pawls carried by the respective arms and means for oscillating the arm for moving the levers with the pawls simultaneously in opposite directions for actuating the wheel with the carrier intermittently.

7. In a manure spreader, the combination of a beater provided with a crank, a slotted arm having one end pivotally secured at a fixed point, a connecting rod engaging with its other end and with the crank, a ratchet wheel, knee levers pivotally connected at one end concentric with the wheel, means movably connecting the other ends thereof with the slot in the arm, and pawls carried by the levers adapted to coact with the wheel.

8. A manure spreader comprising a beater, teeth projecting therefrom in alternating helical lines of respective opposite pitch, a rake head journaled over the beater and parallel with the axis thereof, projecting arms hinged on the rake head, a tail gate pivotally depending from the arms, and lever mechanism for rocking and yieldingly maintaining the rake head with the arms and tail gate in different positions of elevation.

9. A manure spreader comprising a beater, a rake head journaled thereover in fixed bearings, projecting arms independently hinged on the rake head, a tail gate pivotally depending from the arms, and lever mechanism for turning and yieldingly maintaining the rake head with the arms and the tail gate in different positions of elevation.

In witness whereof we have placed our signatures hereto in the presence of two witnesses at Liberty, Indiana this 22nd day of June 1907.

J. F. RUDE.
JOHN W. SMITH.

Witnesses:
H. DARR,
R. S. CARR.